United States Patent
Mattis et al.

(10) Patent No.: US 10,633,552 B2
(45) Date of Patent: Apr. 28, 2020

(54) LITHIUM-SUPPLEMENTING SLURRY FOR ANODE, ANODE AND LITHIUM SECONDARY BATTERY

(71) Applicant: Microvast Power Systems Co., Ltd., Huzhou, Zhejiang Province (CN)

(72) Inventors: Wenjuan Liu Mattis, Huzhou (CN); Xufeng Zang, Huzhou (CN); Jiawei Yin, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 140 days.

(21) Appl. No.: 15/335,397

(22) Filed: Oct. 26, 2016

(65) Prior Publication Data

US 2017/0158903 A1 Jun. 8, 2017

(30) Foreign Application Priority Data

Dec. 7, 2015 (CN) .......................... 2015 1 0889122

(51) Int. Cl.
| | | |
|---|---|---|
| C09D 133/12 | (2006.01) | |
| H01M 4/62 | (2006.01) | |
| H01M 4/583 | (2010.01) | |
| H01M 4/1395 | (2010.01) | |
| H01M 4/1393 | (2010.01) | |
| H01M 4/134 | (2010.01) | |
| H01M 4/133 | (2010.01) | |
| H01M 4/04 | (2006.01) | |
| C09D 5/24 | (2006.01) | |
| C08K 3/08 | (2006.01) | |
| H01M 4/02 | (2006.01) | |
| H01M 4/38 | (2006.01) | |
| H01M 4/587 | (2010.01) | |
| H01M 10/0525 | (2010.01) | |

(52) U.S. Cl.
CPC .............. *C09D 133/12* (2013.01); *C08K 3/08* (2013.01); *C09D 5/24* (2013.01); *H01M 4/0435* (2013.01); *H01M 4/133* (2013.01); *H01M 4/134* (2013.01); *H01M 4/1393* (2013.01); *H01M 4/1395* (2013.01); *H01M 4/583* (2013.01); *H01M 4/622* (2013.01); *C08K 2003/0818* (2013.01); *C08K 2201/001* (2013.01); *H01M 4/386* (2013.01); *H01M 4/387* (2013.01); *H01M 2004/027* (2013.01)

(58) Field of Classification Search
CPC .......... C09D 133/12; C09D 7/69; C09D 7/61; C09D 5/38; C09D 5/24; H01M 4/133; H01M 4/583; H01M 4/0435; H01M 4/1395; H01M 4/134; H01M 4/622; H01M 4/1393; H01M 4/587; H01M 2004/027; H01M 4/386; H01M 4/387; C08K 3/08; C08K 2201/001; C08K 2003/0818

See application file for complete search history.

(56) References Cited

U.S. PATENT DOCUMENTS

| | | | | |
|---|---|---|---|---|
| 7,981,543 B2 * | 7/2011 | Kim | .................... | H01M 4/0404 427/209 |
| 2005/0130043 A1 * | 6/2005 | Gao | .................... | H01M 4/0435 429/231.95 |
| 2009/0280409 A1 * | 11/2009 | Mogi | .................... | H01M 4/621 429/217 |
| 2015/0333318 A1 | 11/2015 | Huang et al. | | |

FOREIGN PATENT DOCUMENTS

| | | |
|---|---|---|
| CN | 1177417 A | 3/1998 |
| CN | 103053048 A | 4/2013 |
| CN | 104078707 A | 10/2014 |
| CN | 104934575 A | 9/2015 |
| CN | 104993098 A | 10/2015 |

\* cited by examiner

*Primary Examiner* — Andrew J. Oyer
(74) *Attorney, Agent, or Firm* — Cheng-Ju Chiang

(57) ABSTRACT

The present invention provides a method of supplementing lithium for an anode used for lithium secondary battery. Particularly, the present invention relates to lithium-supplementing slurry and a method for preparing the same, as well as an anode prepared with the slurry and a lithium secondary battery including the same. In the present invention, the prepolymer is used as a binder for supplementing lithium, the process for preparing the prepolymer is easy to operate and has low cost; the lithium-supplementing method using said prepolymer is easy to operate and has low cost, and it is easy to control the amount of lithium supplemented.

14 Claims, No Drawings

LITHIUM-SUPPLEMENTING SLURRY FOR ANODE, ANODE AND LITHIUM SECONDARY BATTERY

CROSS REFERENCE TO RELATED APPLICATION

The present application is based on and claims priority of Chinese patent application No. 201510889122.5, filed on Dec. 7, 2015. The entire disclosure of the above-identified application, including the specification, drawings and claims are incorporated herein by reference in its entirety.

FIELD OF THE INVENTION

The present invention relates to a method of supplementing lithium for anode used in lithium secondary battery. Particularly, the present invention relates to a lithium-supplementing slurry and a method for preparing the same, an anode prepared with said lithium-supplementing slurry and a lithium secondary battery comprising the anode.

BACKGROUND OF THE INVENTION

Lithium ion batteries (hereinafter referred as "LIB") have become one of the most promising secondary batteries in application and development, due to their advantages of higher voltage, higher energy density and long cycle life-span etc. However, along with the continuous development of intellectualization, miniaturization, longer standby time and longer battery life-span of portable electronic apparatuses, and the popularity of higher power and higher energy devices such as electric vehicles, there are increasing requirements on energy density for LIB. For the anode plate, some lithium is always consumed due to the formation of solid electrolyte interface (SEI) film during the initial charging. This causes lithium loss in cathode material, and results in decreased battery capacity and initial coulombic efficiency. This phenomenon is particularly apparent with anodes utilizing silicon-based or tin-based materials (such as silicon alloy and tin alloy) as their active materials.

One common method to increase initial coulombic efficiency is to supplement the anode with lithium. Some researchers have added lithium powder into the anode slurry to do that, and conventionally, polyvinyldiene fluoride (PVDF) is usually used as binder of anode slurry. The disadvantage of PVDF is that before being used as a binder, it must be dissolved in an organic solvent such as N-methyl-2-pyrrolidone (NMP) However, dissolving PVDF requires large amount of solvent and the solvent is difficult to recycle, which greatly increases production costs. Also, NMP is toxic and can be harmful to technicians. Moreover, lithium powder is light enough to easily float on the surface of the slurry, which makes it difficult to mix uniformly with ordinary solvents and to coat evenly on the current collector. Chinese patent application No. CN1177417A discloses a method to produce lithium-rich LIB, which comprises the following steps: covering an anode surface with a lithium plate, coiling the lithium plate to form battery cells, and then injecting electrolyte to get a lithium-rich LIB. In that conventional method, since conventionally used process to prepare such thin lithium plate in this case is not available, the amount of lithium absorbed by the anode is far less than that provided by the lithium plate. All these will lead to excess supplement of lithium, lithium precipitation in the battery and poor cycle performance etc.

SUMMARY OF THE INVENTION

The present invention provides a lithium-supplementing slurry for the anode which is used for a lithium secondary battery, which comprises lithium metal powder and prepolymer.

In the present invention, supplementing lithium is conducted at a conventional anode prepared in advance, and if necessary, any prepared anode can be supplemented with lithium by the same method as described in the present invention. In the present invention, the prepolymer acts as dispersant and binder, which can reduce costs. After the preparation of the lithium-supplementing slurry, the prepolymer can be polymerized under heating or lighting to prepare an anode. In the present invention, the prepolymers in the lithium-supplementing slurry polymerize under lighting or heating conditions to form a macromolecular polymer, which causes the anode plate to possess certain mechanical strength. Moreover, the prepolymer in the present invention acts as a dispersant, and because of its small molecular weight, better dispersion effect can be achieved when it is mixed with lithium powder. Thus, even lithium powder with smaller particle size can also be dispersed uniformly in the prepolymer, which makes it more convenient to supplement lithium to an anode.

In addition, the electrode binder used conventionally is PVDF, which has excellent chemical and electrochemical stability. However, the disadvantage of PVDF is that before being used as a binder, it needs to be dissolved in an organic solvent such as NMP to form a binder composition. Such process needs huge amount of organic solvent such as NMP, however, such solvent is hard to be recycled, which leads to production cost increasing. Meanwhile, NMP is somewhat toxic, and may be harmful to technicians. As a contrast, the prepolymer used in the present invention can solve the above problem and further get better lithium-supplementing performance.

In one embodiment, the mass of prepolymer is 5~95% of total mass of the lithium-supplementing slurry for the anode. In another embodiment, the mass of prepolymer is 20~50% of total mass of the slurry. Increasing the mass of prepolymer could improve viscosity; in this case, lithium powder with smaller density could be bounded. Meanwhile, using excessive prepolymer will lower the proportion of active material and increase the impedance of the anode. Therefore, appropriately selected mass ratio between the prepolymer and the slurry in the present invention can obtain better lithium-supplementing effect, under the circumstances of ensuring the proportion of the active material.

In one embodiment, the mass ratio of the lithium metal powder and prepolymer is 2:1~1:100. In another embodiment, the mass ratio of the lithium metal powder and prepolymer is 1:1~1:50. In still another embodiment, the mass ratio of the lithium metal powder and prepolymer is 1:4~1:20. The above ratios can further optimize the effect of supplementing lithium.

In one embodiment, said lithium-supplementing slurry for anode further comprises a non-aqueous organic solvent; the mass of the non-aqueous organic solvent is 20~89% of total mass of the said slurry. In another embodiment, the non-aqueous organic solvent is at least one solvent selected from the group consisting of chain alkanes, cyclic alkanes, aromatics, chain ethers, cyclic ethers, esters, sulfoxide, amide, ketone, fluoroalkanes and fluoro carbonates. In still another embodiment, the non-aqueous organic solvent is at least one selected from the group consisting of n-hexane, cyclohexane, benzene, methylbenzene, ethyl acetate, N,N-dimethyl formamide, N,N-dimethyl acetamide, dimethyl sulfoxide, tetrahydrofuran, diethyl ether, acetone, N-methylpyrrolidone, ethylene carbonate, methyl ethyl carbonate, dimethyl carbonate, fluoro n-hexane, fluoro cyclohexane, fluoro ethylene carbonate and propylene carbonate.

In one embodiment, the anode comprises an anode active material selected from at least one of the following: carbon based material, tin based material and silicon based material. In another embodiment, the carbon based material is at least one selected from the group consisting of natural graphite, artificial graphite, meso-carbon microbeads, amorphous graphite, hard carbon and soft carbon.

In one embodiment, the average particle size of lithium metal powder is less than 200 µm. In another embodiment, the average particle size of the lithium metal powder is less than 100 µm. In still another embodiment, the average particle size of the lithium metal powder is less than 60 µm. If the particle size of lithium metal powder is too big, anode slurry prepared with it may be non-uniform, which may result in uneven coating of the slurry, and may even cause the formation of lithium dendrite and bring potential safety hazards. Meanwhile, if the particle size of lithium metal powder is too small, lithium metal powder may drift around, which brings inconvenience to its usage and may do harm to the operator, and even leads to security incident. In the present invention, the introduction of the prepolymer can solve the problems above. Furthermore, it meets the requirement of practicality, high-efficiency and safety even if smaller lithium metal powder is supplemented.

In one embodiment, the viscosity average molecular weight of the prepolymer is between 500~100000. In another embodiment, the viscosity average molecular weight of the prepolymer is between 1000~50000. In still another embodiment, the viscosity average molecular weight of the prepolymer is between 3000~15000. The above viscosity average molecular weight of the prepolymer can ensure uniform dispersion of lithium metal powder and cause the prepolymer to have qualified viscosity as a binder.

In one embodiment, the prepolymer is synthesized from prepolymer monomer through prepolymerization. In another embodiment, the prepolymer monomer is at least one prepolymer monomer selected from the group consisting of benzene alkene, alkyl acrylate, aliphatic alkene, fluorinated alkene, cyanide-containing alkene, polyurethane acrylate and epoxyalkane compounds. In still another embodiment, the prepolymer monomer is at least one prepolymer monomer selected from the group consisting of styrene, 4-nitrostyrene, methyl methacrylate, copolymer of methyl methacrylate and acrylonitrile, and 4-fluorostyrene.

In one embodiment, the reaction time of prepolymerization is between 0.1~48 hours. In another embodiment, the reaction time of prepolymerization is between 0.5~5 hours.

In one embodiment, the prepolymerization is performed at a temperature between −15~150° C. In another embodiment, the prepolymerization is performed at a temperature between 0~100° C.

In one embodiment, an initiator is added during the prepolymerization. In another embodiment, the initiator is at least one selected from the group consisting of 2-hydroxy-2-methylpropiophenone, diphenylmethanone compounds, azo compounds, preoxide compounds and redox compounds. The redox compounds in the present invention refer to mixture of oxidant and reductant. In another embodiment, the initiator is at least one selected from the group consisting of azobis-isobutyronitrile (AIBN), azo-bisiso-heptonitrile, dimethyl azobisisobutyrate (AIBME), hydrogen peroxide, ammonium persulfate, potassium persulfate, sodium persulfate, benzoyl peroxide, tert-butyl benzoyl peroxide, methyl ethyl ketone peroxide and diacyl peroxide.

The present invention also provides an anode for a lithium secondary battery, wherein the said slurry is used in the preparation of the anode.

The present invention also provides a method for preparing the anode used in lithium secondary battery, which comprises the following steps: coating said lithium-supplementing slurry on an anode; treating the lithium-supplementing slurry coating by UV lighting or heating it to carry on polymerization of the prepolymer; and rolling the coating to get the anode for lithium secondary battery.

Conventionally, supplementing lithium for an anode could decrease lithium loss of cathode while forming a SEI film on the anode during initial charging. However, there are still many problems unsolved during lithium supplementing in the conventional process. To solve the above technical problems, the present invention provides a lithium supplementing method, which is easy to use and for which it is easy to control the amount of lithium supplemented and there is lower security risk and relatively low cost. For the present invention, it is convenient to carry on lithium supplementing with prepolymer as binder. Compared with traditional lithium-supplementing technology wherein lithium is supplemented by a mixture of conventional binder and lithium powder, the present invention has the following advantages: first, the prepolymer in the present invention acts as a binder; second, the prepolymer can further be polymerized and thereby improve its polymerization degree, enhancing thermal stability of the polymer materials (for example, by raising decomposition temperature); third, the polymerization of the prepolymer can also improve viscosity and mechanical properties of polymers, and it facilitates the polymer materials to be filled in anode materials. In the present invention, the quantity or viscosity of prepolymer could be adjusted according to the quantity of lithium supplemented. After coating the slurry on an anode, the prepolymer of the invention would undergo a polymerization reaction through UV lighting or heating, and in that way the lithium metal powder could be firmly fixed on the anode. The prepolymer in the present invention cannot react with lithium metal. That is, it does not contain a member of any functional group which can react with lithium, such as hydroxyl, ketone or aldehyde containing active hydrogen. In addition, macromolecular polymers can be formed from the prepolymer after polymerization under UV lighting or heating, which would cause the electrode plate to possess the necessary mechanical strength. The whole lithium supplementing process needs to be conducted under an inert atmosphere.

The rolling method used in the present invention can be a common rolling method such as cold pressing or the like.

In one embodiment, the reaction time of the polymerization is controlled between 0.01~600 seconds. In another embodiment, the reaction time of the polymerization is controlled between 3~100 seconds.

In one embodiment, the reaction temperature of the polymerization is controlled between 0~150° C. In another embodiment, the reaction temperature of the polymerization is controlled between 25~80° C.

In one embodiment, the viscosity average molecular weight of the macromolecule polymers obtained by polymerization is between 50~500 million. In the present invention, the viscosity average molecular weights of the prepolymer and polymer are tested by UbbeloHde Viscometer and calculated to obtain. In one embodiment, an initiator is added during the polymerization. In another embodiment, the initiator is at least one initiator selected from the group consisting of 2-hydroxy-2-methylpropiophenone, diphenylmethanone compounds, azo compounds, preoxide compounds and redox compounds. In still another embodiment, the initiator is at least one initiator selected from the group consisting of azo-bis-iso-butyronitrile (MEM), azo-bis-isoheptonitrile, dimethyl azobisisobutyrate (AIBME), hydrogen peroxide, ammonium persulfate, potassium persulfate, sodium persulfate, benzoyl peroxide, tert-butyl benzoyl peroxide, methyl ethyl ketone peroxide and diacyl peroxide.

The present invention also provides a lithium secondary battery including the above anode.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

Synthesis of prepolymer: conducting a prepolymerization of methyl methacrylate under 50~60° C. for 2~4 hours to obtain a prepolymer of methylmethacrylate; the viscosity average molecular weight of the synthetic prepolymer is between 1000~3000.

Preparation of electrode plate: Mixing methylmethacrylate prepolymer, lithium metal powder and non-aqueous solvent dimethyl carbonate and stirring to get a colloidal slurry in drying room; coating the colloidal slurry onto a prepared anode, wherein the average diameter $D_{50}$ of lithium metal powder tested by LPSA (laser particle size analyzer) is 60 μm, the mass of prepolymer is 50 wt % of that of the colloidal slurry, the mass ratio between lithium metal powder and prepolymer is 1:2, and the mass of non-aqueous solvent is 25 wt % of total mass of the colloidal slurry; then carrying on photocuring under UV condition, where polymerization of methylmethacrylate prepolymer takes place at 30° C. with a reaction time of 600 seconds. Finally coldpressing and yielding an anode.

Embodiment 2

Embodiment 2 is similar to embodiment 1, and the difference is that the prepolymer monomer is copolymer of methyl methacrylate and acrylonitrile during synthesis of prepolymer.

Embodiment 3

Embodiment 3 is similar to embodiment 1, and the difference is that the prepolymer monomer is 4-nitrostyrene, methyl methacrylate and 4-fluorostyrene during synthesis of prepolymer.

Embodiment 4

Embodiment 4 is similar to embodiment 2, and the difference is that during synthesis of prepolymer, the temperature of the prepolymerization is between 50~60° C., the reaction time of prepolymerization is between 2~3 hours, and the viscosity average molecular weight of synthetic prepolymer is between 5000~10000.

Embodiment 5

Embodiment 5 is similar to embodiment 1, and the difference is that during synthesis of prepolymer, the temperature of the prepolymerization is between 60~70° C., and the reaction time of prepolymerization is between 2~3 hours, the viscosity average molecular weight of synthetic prepolymer is between 20000~30000.

Embodiment 6

Embodiment 6 is similar to embodiment 1, and the difference is that during synthesis of prepolymer, the temperature of the prepolymerization is between 70~80° C., the reaction time of prepolymerization is between 2~3 hours, the viscosity average molecular weight of synthetic prepolymer is between 30000~40000.

Embodiment 7

Embodiment 7 is similar to embodiment 1, and the difference is that during preparation of electrode plate, prepolymerization is conducted under UV lighting, wherein the reaction time is 15 seconds, the mass ratio of lithium metal powder and prepolymer is 1:20, no non-aqueous solvent is used.

Embodiment 8

Embodiment 8 is similar to embodiment 1, and the difference is that during preparation of electrode plate, prepolymerization is conducted under UV lighting, wherein the reaction time is 7 seconds, the mass ratio of lithium metal powder and prepolymer is 1:4, no non-aqueous solvent is used.

Embodiment 9

Embodiment 9 is similar to embodiment 1, and the difference is that an initiator is introduced into prepolymerization reaction during synthesis of prepolymer, and is also introduced into polymerization reaction during preparation of electrode plate, and said initiator is azo-bis-isobutyronitrile.

Embodiment 10

Embodiment 10 is similar to embodiment 1, and the difference is that an initiator is introduced into polymerization reaction during preparation of electrode plate, and said initiator is benzoyl peroxide and hydrogen peroxide.

Embodiment 11

Embodiment 11 is similar to embodiment 1, the difference is that an initiator is introduced into polymerization reaction during preparation of electrode plate, and said initiator is sodium persulfate and potassium persulfate.

Embodiment 12

Embodiment 12 is similar to embodiment 1, the difference is that the reaction time of the prepolymerization is between 17~18 hours, the viscosity average molecular weight of synthetic prepolymer is between 38000~50000.

Embodiment 13

Embodiment 13 is similar to embodiment 1, the difference is that during synthesis of prepolymer, the temperature of prepolymerization is between −15~30° C. and the reaction time of prepolymerization is between 35~40 hours, the viscosity average molecular weight of synthetic prepolymer is between 800~1000.

Embodiment 14

Embodiment 14 is similar to embodiment 1, the difference is that during synthesis of prepolymer, the temperature of prepolymerization is between 120~150° C. and the reaction time of prepolymerization is between 0.1~1 hour, the viscosity average molecular weight of synthetic prepolymer is between 80000~100000.

Embodiment 15

Embodiment 15 is similar to embodiment 1, the difference is that during preparation of electrode plate, the mass of prepolymer is 90 wt % of the total mass of the colloidal slurry, no non-aqueous solvent is used.

Embodiment 16

Embodiment 16 is similar to embodiment 1, the difference is that during preparation of electrode plate, the mass of prepolymer is 10 wt % of the total mass of the colloidal slurry; and the mass ratio between lithium metal powder and prepolymer is 1:10, the mass of non-aqueous solvent dimethyl carbonate is 89 wt % of the total mass of colloidal slurry.

Embodiment 17

Embodiment 17 is similar to embodiment 1, the difference is that during preparation of electrode plate, the mass of prepolymer is 10 wt % of the total mass of the colloidal slurry; and the mass ratio between lithium metal powder and prepolymer is 2:1, the mass of non-aqueous solvent dimethyl carbonate is 70 wt % of the total mass of colloidal slurry.

Embodiment 18

Embodiment 18 is similar to embodiment 1, the difference is that during preparation of electrode plate, the average diameter $D_{50}$ of lithium metal powder tested by LPSA (laser particle size analyzer) is 150 μm.

What is claimed is:

1. A lithium-supplementing slurry for an anode, consisting of a lithium metal powder, a prepolymer and an optional non-aqueous organic solvent, the lithium-supplementing slurry is applied to be coated on the anode which is prepared in advance, a mass ratio of the lithium metal powder and prepolymer is between 2:1 and 1:100, the prepolymer is synthesized from prepolymer monomer through a prepolymerization reaction, the prepolymer monomer is at least one selected from the group consisting of alkyl acrylate, aliphatic alkene, cyanide-containing alkene, polyurethane acrylate and epoxyalkane compounds;

a viscosity average molecular weight of the prepolymer is between 500 and 15000; and the optional non-aqueous organic solvent is at least one selected from the group consisting of ester, sulfoxide, amide, ketone, fluoroalkanes and fluoro carbonate.

2. The slurry of claim 1, wherein a mass of prepolymer is 5~95% of total mass of said slurry.

3. The slurry of claim 1, wherein the mass of the non-aqueous organic solvent is 20~89% of total mass of said slurry.

4. The slurry of claim 1, wherein the non-aqueous organic solvent is at least one solvent selected from the group consisting of ethyl acetate, N,N-dimethyl formamide, N,N-dimethyl acetamide, dimethyl sulfoxide, acetone, N-methylpyrrolidone, ethylene carbonate, methyl ethyl carbonate, dimethyl carbonate, fluoro n-hexane, fluoro cyclohexane, fluoro ethylene carbonate and propylene carbonate.

5. The slurry of claim 1, wherein the anode comprises an anode active material which is at least one material selected from a carbon based material, a tin based material and a silicon based material.

6. The slurry of claim 5, wherein the carbon based material is at least one selected from the group consisting of natural graphite, artificial graphite, meso-carbon microbeads, amorphous graphite, hard carbon and soft carbon.

7. The slurry of claim 1, wherein the average particle size of the lithium metal powder is less than 200 μm.

8. The slurry of claim 1, wherein the prepolymer monomer is at least one selected from the group consisting of methyl methacrylate, and copolymer of methyl methacrylate and acrylonitrile.

9. The slurry of claim 1, wherein the reaction time of prepolymerization is between 0.1~48 hours.

10. The slurry of claim 1, wherein the prepolymerization is performed at a temperature between −15° C. and 150° C.

11. The slurry of claim 1, wherein an initiator is added during the prepolymerization.

12. The slurry of claim 11, wherein the initiator is at least one selected from the group consisting of 2-hydroxy-2-methylpropiophenone, diphenylmethanone compounds, azo compounds, preoxide compounds and redox compounds.

13. The slurry of claim 12, wherein the initiator is at least one selected from the group consisting of azo-bis-iso-butyronitrile (AIBN), azo-bis-isoheptonitrile, dimethyl azobisisobutyrate (AIBME), hydrogen peroxide, ammonium persulfate, potassium persulfate, sodium persulfate, benzoyl peroxide, tert-butyl benzoyl peroxide, methyl ethyl ketone peroxide and diacyl peroxide.

14. The slurry of claim 4, wherein the non-aqueous organic solvent is dimethyl carbonate.

* * * * *